(12) United States Patent
Yagoub et al.

(10) Patent No.: US 7,634,456 B2
(45) Date of Patent: Dec. 15, 2009

(54) SQL STRUCTURE ANALYZER

(75) Inventors: Khaled Yagoub, San Mateo, CA (US);
Benoit Dageville, Foster City, CA (US);
Mohamed Ziauddin, Pleasanton, CA (US); Mohamed Zait, San Jose, CA (US); Karl Dias, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 420 days.

(21) Appl. No.: 10/936,426

(22) Filed: Sep. 7, 2004

(65) Prior Publication Data

US 2005/0120001 A1      Jun. 2, 2005

Related U.S. Application Data

(60) Provisional application No. 60/500,490, filed on Sep. 6, 2003.

(51) Int. Cl.
*G06F 7/00* (2006.01)
*G06F 17/30* (2006.01)

(52) U.S. Cl. .................... 707/2; 707/4; 707/100
(58) Field of Classification Search .............. 707/2
See application file for complete search history.

(56) References Cited

U.S. PATENT DOCUMENTS

| | | | |
|---|---|---|---|
| 5,140,685 A | 8/1992 | Sipple et al. | |
| 5,260,697 A | 11/1993 | Barrett et al. | |
| 5,398,183 A | 3/1995 | Elliott | |
| 5,408,653 A | 4/1995 | Josten et al. | |
| 5,481,712 A | 1/1996 | Silver et al. | |
| 5,504,917 A | 4/1996 | Austin | |
| 5,544,355 A | 8/1996 | Chaudhuri et al. | |
| 5,577,240 A | 11/1996 | Demers et al. | |
| 5,634,134 A | 5/1997 | Kumai et al. | |
| 5,724,569 A | 3/1998 | Andres | |
| 5,737,601 A | 4/1998 | Jain et al. | |
| 5,761,660 A | 6/1998 | Josten et al. | |
| 5,765,159 A | 6/1998 | Srinivasan | |
| 5,781,912 A | 7/1998 | Demers et al. | |
| 5,794,227 A | 8/1998 | Brown | |
| 5,794,229 A | 8/1998 | French et al. | |
| 5,806,076 A | 9/1998 | Ngai et al. | |
| 5,860,069 A | 1/1999 | Wright | |
| 5,870,760 A | 2/1999 | Demers et al. | |
| 5,870,761 A | 2/1999 | Demers et al. | |

(Continued)

OTHER PUBLICATIONS

Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.

(Continued)

*Primary Examiner*—Tim T. Vo
*Assistant Examiner*—Jay A Morrison
(74) *Attorney, Agent, or Firm*—Vista IP Law Group, LLP.

(57) ABSTRACT

A method to addresses structural performance problems of a database query language statement is provided. The method includes receiving a database query language statement at an optimizer, evaluating choices in a search space to generate an execution plan for the statement, and producing annotations to record one or more reasons for selecting each choice while generating the execution plan.

31 Claims, 2 Drawing Sheets

```
SQL                AUTO-TUNING
STATEMENT    →    OPTIMIZER                      TUNING
120                110                        →  RECOMMENDATIONS
                    ┌──────────┐
                    │STRUCTURE │
                    │ANALYZER  │
                    │   130    │
                    └──────────┘
```

U.S. PATENT DOCUMENTS

| | | | |
|---|---|---|---|
| 5,940,826 | A | 8/1999 | Heideman et al. |
| 5,963,933 | A * | 10/1999 | Cheng et al. ................... 707/2 |
| 5,963,934 | A * | 10/1999 | Cochrane et al. ............... 707/2 |
| 5,991,765 | A | 11/1999 | Vethe |
| 6,052,694 | A | 4/2000 | Bromberg |
| 6,122,640 | A | 9/2000 | Pereira |
| 6,195,653 | B1 | 2/2001 | Bleizeffer et al. |
| 6,212,514 | B1 | 4/2001 | Eberhard et al. |
| 6,275,818 | B1 * | 8/2001 | Subramanian et al. ......... 707/2 |
| 6,321,218 | B1 | 11/2001 | Guay et al. |
| 6,330,552 | B1 | 12/2001 | Farrar et al. |
| 6,349,310 | B1 | 2/2002 | Klein et al. |
| 6,353,818 | B1 | 3/2002 | Carino, Jr. |
| 6,356,889 | B1 | 3/2002 | Lohman et al. |
| 6,366,901 | B1 | 4/2002 | Ellis |
| 6,366,903 | B1 | 4/2002 | Agrawal et al. |
| 6,374,257 | B1 | 4/2002 | Guay et al. |
| 6,397,207 | B1 | 5/2002 | Bleizeffer et al. |
| 6,397,227 | B1 | 5/2002 | Klein et al. |
| 6,434,545 | B1 | 8/2002 | MacLeod et al. |
| 6,434,568 | B1 | 8/2002 | Bowman-Amuah |
| 6,442,748 | B1 | 8/2002 | Bowman-Amuah |
| 6,460,027 | B1 * | 10/2002 | Cochrane et al. ............... 707/2 |
| 6,460,043 | B1 | 10/2002 | Tabbara et al. |
| 6,493,701 | B2 | 12/2002 | Ponnekanti |
| 6,496,850 | B1 | 12/2002 | Bowman-Amuah |
| 6,513,029 | B1 * | 1/2003 | Agrawal et al. ................ 707/2 |
| 6,529,901 | B1 * | 3/2003 | Chaudhuri et al. ............. 707/3 |
| 6,560,606 | B1 | 5/2003 | Young |
| 6,571,233 | B2 | 5/2003 | Beavin et al. |
| 6,594,653 | B2 | 7/2003 | Colby et al. |
| 6,598,038 | B1 | 7/2003 | Guay et al. |
| 6,615,223 | B1 | 9/2003 | Shih et al. |
| 6,701,345 | B1 | 3/2004 | Carley et al. |
| 6,714,943 | B1 | 3/2004 | Ganesh et al. |
| 6,721,724 | B1 * | 4/2004 | Galindo-Legaria et al. ..... 707/2 |
| 6,728,719 | B1 | 4/2004 | Ganesh et al. |
| 6,728,720 | B1 | 4/2004 | Lenzie |
| 6,744,449 | B2 | 6/2004 | MacLeod et al. |
| 6,763,353 | B2 | 7/2004 | Li et al. |
| 6,804,672 | B1 | 10/2004 | Klein et al. |
| 6,816,874 | B1 | 11/2004 | Cotner et al. |
| 6,839,713 | B1 | 1/2005 | Shi et al. |
| 6,850,925 | B2 | 2/2005 | Chaudhuri et al. |
| 6,865,567 | B1 * | 3/2005 | Oommen et al. ................ 707/2 |
| 6,910,109 | B2 | 6/2005 | Holman et al. |
| 6,912,547 | B2 | 6/2005 | Chaudhuri et al. |
| 6,915,290 | B2 * | 7/2005 | Bestgen et al. ................. 707/2 |
| 6,931,389 | B1 | 8/2005 | Bleizeffer et al. |
| 6,934,701 | B1 | 8/2005 | Hall, Jr. |
| 6,947,927 | B2 | 9/2005 | Chaudhuri et al. |
| 6,961,931 | B2 | 11/2005 | Fischer |
| 6,999,958 | B2 | 2/2006 | Carlson et al. |
| 7,007,013 | B2 | 2/2006 | Davis et al. |
| 7,031,958 | B2 | 4/2006 | Santosuosso |
| 7,047,231 | B2 | 5/2006 | Grasshoff et al. |
| 7,058,622 | B1 | 6/2006 | Tedesco |
| 7,080,062 | B1 | 7/2006 | Leung et al. |
| 7,139,749 | B2 * | 11/2006 | Bossman et al. ............... 707/3 |
| 7,146,363 | B2 | 12/2006 | Waas et al. |
| 7,155,426 | B2 | 12/2006 | Al-Azzawe |
| 7,155,459 | B2 | 12/2006 | Chaudhuri et al. |
| 7,272,589 | B1 | 9/2007 | Guay et al. |
| 7,302,422 | B2 | 11/2007 | Bossman et al. |
| 7,353,219 | B2 | 4/2008 | Markl et al. |
| 2002/0073086 | A1 | 6/2002 | Thompson et al. |
| 2002/0120617 | A1 | 8/2002 | Yoshiyama et al. |
| 2002/0198867 | A1 | 12/2002 | Lohman et al. |
| 2003/0018618 | A1 | 1/2003 | Bestgen et al. |
| 2003/0065648 | A1 | 4/2003 | Driesch et al. |
| 2003/0088541 | A1 | 5/2003 | Zilio et al. |
| 2003/0093408 | A1 * | 5/2003 | Brown et al. ................... 707/2 |
| 2003/0110153 | A1 | 6/2003 | Shee |
| 2003/0115183 | A1 | 6/2003 | Abdo et al. |
| 2003/0126143 | A1 * | 7/2003 | Roussopoulos et al. ..... 707/100 |
| 2003/0130985 | A1 | 7/2003 | Driesen et al. |
| 2003/0135478 | A1 | 7/2003 | Marshall et al. |
| 2003/0154216 | A1 | 8/2003 | Arnold et al. |
| 2003/0177137 | A1 | 9/2003 | MacLeod et al. |
| 2003/0182276 | A1 * | 9/2003 | Bossman et al. ............... 707/3 |
| 2003/0187831 | A1 | 10/2003 | Bestgen et al. |
| 2003/0200204 | A1 | 10/2003 | Limoges et al. |
| 2003/0200537 | A1 | 10/2003 | Barsness et al. |
| 2003/0229621 | A1 | 12/2003 | Carlson et al. |
| 2003/0229639 | A1 | 12/2003 | Carlson et al. |
| 2004/0002957 | A1 | 1/2004 | Chaudhuri et al. |
| 2004/0003004 | A1 * | 1/2004 | Chaudhuri et al. .......... 707/200 |
| 2004/0019587 | A1 | 1/2004 | Fuh et al. |
| 2004/0034643 | A1 | 2/2004 | Bonner et al. |
| 2004/0181521 | A1 | 9/2004 | Simmen et al. |
| 2004/0210563 | A1 | 10/2004 | Zait et al. |
| 2004/0215626 | A1 | 10/2004 | Colossi et al. |
| 2005/0033734 | A1 | 2/2005 | Chess et al. |
| 2005/0097078 | A1 | 5/2005 | Lohman et al. |
| 2005/0097091 | A1 | 5/2005 | Ramacher et al. |
| 2005/0102305 | A1 | 5/2005 | Chaudhuri et al. |
| 2005/0119999 | A1 | 6/2005 | Zait et al. |
| 2005/0120000 | A1 | 6/2005 | Ziauddin et al. |
| 2005/0120001 | A1 | 6/2005 | Yagoub et al. |
| 2005/0125393 | A1 | 6/2005 | Yagoub et al. |
| 2005/0125398 | A1 | 6/2005 | Das et al. |
| 2005/0125427 | A1 | 6/2005 | Dageville et al. |
| 2005/0125452 | A1 | 6/2005 | Ziauddin et al. |
| 2005/0138015 | A1 | 6/2005 | Dageville et al. |
| 2005/0177557 | A1 | 8/2005 | Ziauddin et al. |
| 2005/0187917 | A1 | 8/2005 | Lawande et al. |
| 2005/0251523 | A1 | 11/2005 | Rajamani et al. |
| 2006/0004828 | A1 | 1/2006 | Rajamani et al. |
| 2006/0167883 | A1 | 7/2006 | Boukobza |
| 2007/0038618 | A1 | 2/2007 | Kosciusko et al. |

OTHER PUBLICATIONS

Almeida, et al., "Panasync: Dependency tracking among file copies", Proceedings of the 9th Workshop on ACM SIGOPS European Workshop: Beyond the PC: New Challenges for the Operating System, Kolding, Denmark, 2000, pp. 7-12.

Baldoni, et al., "A Communication-Induced Checkpointing Protocol that Ensures Rollback-Dependency Trackability", 27th Annual International Symposium on Fault-Tolerant Computing, FTCS-27, IEEE, 1997, pp. 68-77.

Baldoni, et al., "Rollback-Dependency Trackability: Visible Characterizations", Proceedings of the 18th Annual ACM Symposium on Principles of Distributed Computing, Atlanta, GA, 1999, pp. 33-42.

Damani, et al, "Optimistic Distributed Simulation Based on Transitive Dependency Tracking", Proceedings of the 11th Workshop on Parellel and Distributed Simulation, IEEE, 1997, pp. 90-97.

Elnozahy. "On the Relevance of Communication Costs of Rollback-Recovery Protocols", Proceedings of the 14th Annual ACM Symposium on Principles of Distributed Computing, Ottawa, Ontario, Canada, 1995, pp. 74-79.

Garcia, et al., "On the Minimal Characterization of the Rollback-Dependency Trackability Property", 21st International Conference on Distributed Computing Systems, IEEE, Apr. 16-19, 2001, pp. 342-349.

Graefe, G. "Dynamic Query Evaluation Plans: Some Course Corrections?", Bulletin of the IEEE Computer Society Technical Committee on Data Engineering, Jun. 2000, vol. 23, No. 2, pp. 3-6.

Hellerstein, J.M. et al. "Adaptive Query Processing: Technology in Evolution", Bulletin of the IEEE Computer Society Technical Committee on Data Engineering, Jun. 2000, vol. 23, No. 2, pp. 7-18.

Kabra, N. et al. "Efficient Mid-Query Re-Optimization of Sub-Optimal Query Execution Plans", Proceedings of the 1998 ACM SIGMOD International Conference on Management of Data, SIGMOD'98, Seattle, WA, 1998, pp. 106-117.

Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.

Perry, "Consumer Electronics", IEEE Spectrum, Jan. 1997, vol. 34, No. 1, pp. 43-48.

Sadri, "Integrity Constraints in the Information Source Tracking Method", IEEE Transactions on Knowledge and Data, Feb. 1995, vol. 7, Issue 1, pp. 106-119.

Sreenivas, et al., "Independent Global Snapshots in Large Distributed Systems", Proceedings of the 4th International Conference on High Performance Computing, IEEE, Dec. 18-21, 1997, pp. 462-467.

Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.

Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.

Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.

Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.

Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.

Chaudhuri, S. et al. "Rethinking Database System Architecture: Towards a Self-Tuning RISC-style Database System" Proceedings of the 26th International Conference on Very Large Databases (VLDB 2000), Cairo, Eqypt, Sep. 10-14, 2000, pp. 1-10.

Chen, C.M. et al. "Adaptive Selectivity Estimation Using Query Feedback" Proceedings of the 1994 ACM SIGMOD International Conference on Management of Data (SIGMOD '94) Minneapolis, MN, May 24-27, 1994, pp. 161-172.

Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.

Ganek, A.G. et al. "The dawning of the automatic computing era" IBM Systems Journal, 2003, vol. 42, No. 1, pp. 5-18.

Gassner, P. et al. "Query Optimization in the IBM DB2 Family" Data Engineering, Dec. 1993, vol. 16, No. 4, pp. 4-18.

Getoor, L. et al. "Selectivity Estimation using Probabilistic Models" Proceedings of the 2001 ACM SIGMOD International Conference on Management of Data (SIGMOD '01) Santa Barbara, CA, May 21-24, 2001, pp. 461-472.

Gorman, T. "The Search for Intelligent Life in the Cost-Based Optimizer" Jul. 2001, v1.0, pp. 1-11.

IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.

Ives, Z.G. et al. "An Adaptive Query Execution System for Data Integration" Proceedings of the 1999 ACM SIGMOD International Conference on Management of Data (SIGMOD '99), Philadephia, PA, Jun. 1-3, 1999, pp. 299-310.

Lightstone, S.S. et al. "Toward Autonomic Computing with DB2 Universal Database" ACM SIGMOD Record, Sep. 2002, vol. 31, No. 3, pp. 55-61.

Markl, V. et al. "LEO: An autonomic query optimizer for DB2" IBM Systems Journal, 2003, vol. 42, No. 1, pp. 98-106.

Scheuermann, P. et al. "Adaptive Algorithms for Join Processing in Distributed Database Systems" Distributed and Parallel Databases, 1997, vol. 5, pp. 233-269.

Slivinskas, G. et al. "Adaptable Query Optimization and Evaluation in Termporal Middleware" Proceedings of the 2001 ACM SIGMOD International Conference on Management of Data (SIGMOD '01) Santa Barbara, CA, May 21-24, 2001, pp. 127-138.

Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.

Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.

Office Action dated May 2, 2007 for U.S. Appl. No. 10/935,908.
Office Action dated Apr. 19, 2007 for U.S. Appl. No. 10/936,205.
Office Action dated Sep. 6, 2007 for U.S. Appl. No. 10/936, 205.
Office Action dated Feb. 7, 2007 for U.S. Appl. No. 10/936,781.
Office Action dated Jul. 30, 2007 for U.S. Appl. No. 10/936,781.
Office Action dated Jan. 26, 2007 for U.S. Appl. No. 10/936,427.
Office Action dated Aug. 22, 2007 for U.S. Appl. No. 10/936,427.
Office Action dated Jan. 25, 2007 for U.S. Appl. No. 10/936,778.

Kabra et al., "Efficient Mid-Query Re-Optimization of Sub-Optimal Query Execution Plans", SIGMOD '98, Seattle, WA, USA, 1998, pp. 106-117.

Ioannidis et al, "Parametric Query Optimization", Proceedings of the 18 VLDB Conference, Vancouver, BC, Canada 1992, pp. 103-114.

Office Action dated Feb. 22, 2007 for U.S. Appl. No. 10/936,468.
Office Action dated Aug. 22, 2007 for U.S. Appl. No. 10/936,468.
Office Action dated Jan. 25, 2007 for U.S. Appl. No. 10/935,906.
Office Action dated Aug. 9, 2007 for U.S. Appl. No. 10/935,906.
Office Action dated Jan. 24, 2007 for U.S. Appl. No. 10/936,779.
Office Action dated Aug. 22, 2007 for U.S. Appl. No. 10/936, 779.
Office Action dated Mar. 9, 2007 for U.S. Appl. No. 10/936,469.
Office Action dated Oct. 17, 2007 for U.S. Appl. No. 10/936,469.
Office Action dated Apr. 20, 2007 for U.S. Appl. No. 10/936,449.
Office Action dated Nov. 25, 2008 for U.S. Appl. No. 10/935,906.
Office Action dated Apr. 9, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Oct. 16, 2008 for U.S. Appl. No. 10/936,205.
Office Action dated Mar. 24, 2008 for U.S. Appl. No. 10/936,205.
Office Action dated Nov. 10, 2008 for U.S. Appl. No. 10/936,781.
Office Action dated Apr. 1, 2008 for U.S. Appl. No. 10/936,781.
Office Action dated Oct. 15, 2008 for U.S. Appl. No. 10/936,468.
Office Action dated Mar. 18, 2008 for U.S. Appl. No. 10/936,427.
Office Action dated Apr. 2, 2008 for U.S. Appl. No. 10/936,468.
Office Action dated Sep. 22, 2008 for U.S. Appl. No. 10/936,449.
Office Action dated Oct. 20, 2008 for U.S. Appl. No. 10/935,908.
Office Action dated Jul. 17, 2008 for U.S. Appl. No. 10/935,908.
Office Action dated Apr. 30, 2008 for U.S. Appl. No. 10/935,908.
Office Action dated Dec. 29, 2008 for U.S. Appl. No. 10/936,468.
Office Action dated Dec. 11, 2008 for U.S. Appl. No. 10/936,469.
Office Action dated May 29, 2008 for U.S. Appl. No. 10/936,469.
Office Action dated Oct. 8, 2008 for U.S. Appl. No. 10/936,778.
Office Action dated Jul. 24, 2008 for U.S. Appl. No. 10/936,778.
Office Action dated Jan. 22, 2009 for U.S. Appl. No. 10/936,778.

Markl et al. "Learning Table Access Cardinalities with LEO" SIGMOD '02, Jun. 3-6, 2002, p. 613.

Stillger et al. "LEO - DB2's Learning Optimizer" VLDB 2001.

Office Action dated Apr. 29, 2009 for U.S. Appl. No. 10/936,781.
Office Action dated Apr. 29, 2009 for U.S. Appl. No. 10/935,908.
Office Action dated May 12, 2009 for U.S. Appl. No. 10/936,779.
Notice of Allowance dated May 6, 2009 for U.S. Appl. No. 10/936,205.
Office Action dated Sep. 6, 2007 for U.S. Appl. No. 10/936,449.
Office Action dated Mar. 28, 2008 for U.S. Appl. No. 10/936,449.
Office Action dated Mar. 4, 2009 for U.S. Appl. No. 101936,449.
Office Action dated Apr. 3, 2009 for U.S. Appl. No. 10/936,468.
Office Action dated May 11, 2009 for U.S. Appl. No. 10/935,906.
Office Action dated Mar. 31, 2009 for U.S. Appl. No. 10/936,427.
Office Action dated May 28, 2009 for U.S. Appl. No. 10/936,469.
Office Action dated Jul. 2, 2009 for U.S. Appl. No. 10/936,778.

* cited by examiner

SQL STRUCTURE ANALYZER

CROSS-REFERENCE TO RELATED APPLICATIONS

This application claims the benefit of U.S. Provisional Application No. 60/500,490, filed Sep. 6, 2003, which is incorporated herein by reference in its entirety. This application is related to applications "SQL TUNING SETS," with U.S. application Ser. No. 10/936,449, now published as U.S. Publication No. 2005/0125393; "SQL PROFILE," with U.S. application Ser. No. 10/936,205, now published as U.S. Publication No. 2005/0125452; "AUTO-TUNING SQL STATEMENTS," with U.S. application Ser. No. 10/935,908, now published as U.S. Publication No. 2005/0120000; "GLOBAL HINTS," with U.S. application Ser. No. 10/936,781, now published as U.S. Publication No. 2005/0125398; "SQL TUNING BASE," with U.S. application Ser. No. 10/936,468, now published as U.S. Publication No. 2005/0097091; "AUTOMATIC LEARNING OPTIMIZER," with U.S. application Ser. No. 10/935,906, now published as U.S. Publication No. 2005/0119999; "AUTOMATIC PREVENTION OF RUN-AWAY QUERY EXECUTION," with U.S. application Ser. No. 10/936,779, now published as U.S. Publication No. 2005/0177557; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," with U.S. application Ser. No. 10/936,469, now published as U.S. Publication No. 2005/0187917; "HIGH LOAD SQL DRIVEN STATISTICS COLLECTION," with U.S. application Ser. No. 10/936,427, now published as U.S. Publication No. 2005/0138015; "AUTOMATIC SQL TUNING ADVISOR," with U.S. application Ser. No. 10/936,778, now published as U.S. Publication No. 2005/0125427, all of which are filed Sep. 7, 2004 and are incorporated herein by reference in their entirety.

FIELD OF THE INVENTION

This invention is related to the field of database management.

BACKGROUND

Currently, database administrators (DBAS) and application developers spend a large amount of time trying to tune poorly performing and resource intensive SQL statements (which is commonly referred to as bad sql). However, it is often a very challenging task. First, it requires a high level of expertise in several complex areas, such as query optimization and SQL design. Second, it is a time consuming process because each statement is unique and needs to be tuned individually. Third, it requires an intimate knowledge of the database (i.e., view definitions, indexes, table sizes, etc.) as well as the application (e.g. process flow, system load). Finally, the SQL tuning activity is a continuous task because the SQL workload and the database are always changing. As a result, tuning is often done on a trial and error basis, resulting in loss of productivity.

Often a SQL statement can be a high load SQL statement simply because it is badly written. This usually happens when there are different, but not semantically equivalent, ways to write a statement to produce same result. Knowing which of these alternate forms is most efficient in producing the query result is a difficult and daunting task for application developers since it requires both a deep knowledge about the properties of data they are querying as well as a very good understanding of the semantics and performance of SQL constructs.

To help DBAs and application developers overcome these challenges, several software companies have developed diagnostics tools that help identify SQL performance issues and suggest actions to fix them. However, these tools are not integrated with the database compiler, which is the system component that is most responsible for SQL performance. Indeed, these tools interpret the optimization information outside of the database to perform the tuning, so their tuning results are less robust and limited in scope. Moreover, they cannot directly tackle the internal challenges faced in producing an optimal execution plan.

The SQL Structure Analyzer component of the Automatic Tuning Optimizer performs what-if analysis to recognize missed query rewrite opportunities and makes SQL restructuring recommendations for the user to undertake.

SUMMARY

A method to address structural performance problems of a database query language statement is described. The method includes receiving a database query language statement at an optimizer, evaluating choices in a search space to generate an execution plan for the statement, and producing annotations to record one or more reasons for selecting or rejecting each choice while generating the execution plan. The method can further include the examination of the annotations associated with the costly operators in the chosen plan and producing appropriate SQL restructuring recommendations to improve the execution performance of the statement.

DETAILED DESCRIPTION

Overview

Figure 1:
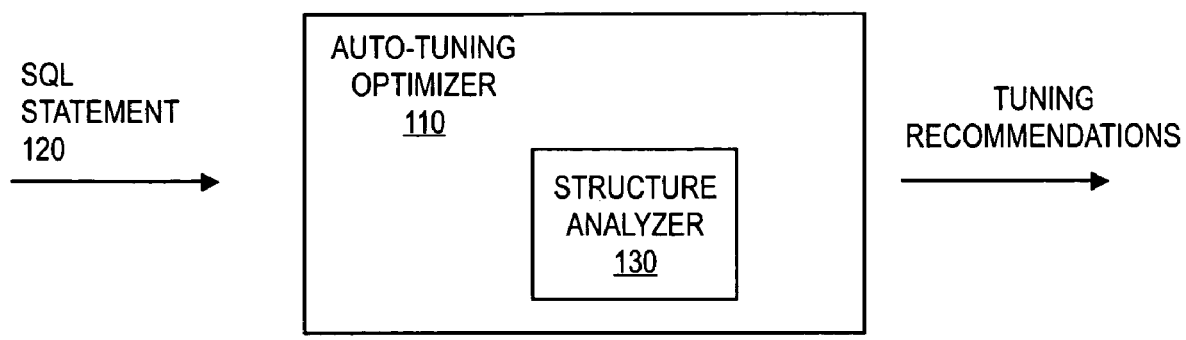
FIG. 1 shows an example of a device that includes the SQL Structure Analyzer.

The embodiments of the invention are described using the term "SQL", however, the invention is not limited to just this exact database query language, and indeed may be used in conjunction with other database query languages and constructs.

A SQL Structure Analyzer is a component of an Automatic Tuning Optimizer that addresses structural performance problems of a statement. This component can be used by programmers, during an application development, to detect poorly written SQL statements, and apply alternative ways of rewriting them to improve the performance. The analyzer can determine whether a SQL statement is a high load statement simply because it is badly written. For example, different, but not necessarily semantically equivalent, ways to write a statement to produce same result can be examined to determine which of these alternate forms is most efficient. Although this is a difficult and daunting task for application developers, since it requires both a deep knowledge about the properties of data they are querying as well as a very good understanding of the semantics and performance of SQL constructs, the optimizer can perform the structural analysis process in an efficient manner.

Performing the structural analysis of a statement within and by the automatic tuning optimizer itself, while generating an execution plan for the statement, allows the procedure to identify and gather information about the statement's structure that will help produce an efficient plan. The method can use this information to compare different, but not necessarily equivalent, ways of writing a statement to produce the same result.

The query optimizer can perform extensive query transformations while preserving the semantics of the original query. Some of the transformations are based on heuristics (i.e. internal rules), but many others are based on cost-based selection. Examples of query transformations include subquery unnesting, materialized view (MV) rewrite, simple and complex view merging, rewrite of grouping sets into UNIONs, and other types of transformations.

The query optimizer may apply a transformation when the query can be rewritten into a semantically equivalent form. Semantic equivalence can be established when certain conditions are met; for example, a particular column in a table has the non-null property. However, these conditions may not exist in the database but can be enforced by the application. The SQL Structure Analyzer performs what-if analysis to recognize missed query rewrite opportunities and makes recommendations for the user to undertake.

When a rewrite is not possible, the optimizer generates diagnostic information in the form of internal annotations to remember the reasons why the particular rewrite was not possible. The annotations can include necessary conditions that were not met, as well as various choices that were available during the plan generation process. After a best plan is generated, the optimizer examines the annotations, and produces appropriate recommendations for improving the execution plan. For example, the recommendations can be suggestions on how to rewrite the statement, as well as suggestions for changing the schema, in order to improve the performance of the statement. In addition, the optimizer can use the an notations to produce rationale and informative messages about potential improvements that can be made to the statement, in order to educate application developers who code the SQL statement.

One possible output from the SQL Structure Analyzer can be a rewritten SQL text that the user can accept as an alternative form of the original statement. If the user accepts the alternate form then he has to pass the rewritten SQL text as input to the query optimizer in place of original SQL text.

The SQL structural analysis is a cost-based process, wherein it considers the annotations associated with costly operators in the annotated execution plan. As a result, the process generates recommendations for costly nodes and operators that, when reconsidered by changing the structure of the query statement, will significantly improve the performance of the execution plan. For example, a costly node can be defined as a node having an individual cost that is greater than a threshold, such as 10% of the total plan cost. The recommendation for the costly operator is then mapped to the corresponding node in the plan tree, as well as to the operator in the SQL statement.

An example of a device that includes the SQL Structure Analyzer is shown in FIG. 1. The Auto-tuning optimizer 110 receives a SQL statement 120. Then, the optimizer generates an execution plan for the statement. During the plan generation process, the SQL Structure Analyzer 130 generates diagnostic information for the statement. For example, when the optimizer 110 evaluates choices for the plan, the Analyzer 130 can produce annotations to the plan to explain a choice made by the optimizer.

The annotations can include alternatives that were considered and rejected. An alternative structure can be rejected because it may cause a change in the query results. An alternative may also be rejected for other reasons as well. For example, when the optimizer explores the possibility of merging a view, it runs its tests to determine if it is logically possible to merge a view. If this is not possible, the analyzer records the reason for not being able to merge the view in the execution plan. If the optimizer can merge the view, but it decides not to merge it, then the analyzer can record the reason for not choosing to merge the view.

The annotated plan is then examined by the optimizer to generate recommendations for rewriting the statement, as well as recommendations on schema changes to improve the performance of the SQL statement. For example, after gathering information about the structure of the statement, the optimizer can identify an expensive operator in the statement. Using the annotations for the expensive node, the optimizer can access a knowledge base or a rule base to retrieve a rule for replacing the expensive operator in the statement with a less expensive operator.

If the expensive operator is, for example, a UNION operator, the optimizer can find a rule in the knowledge base for this operator, such as "replace UNION with UNION ALL." The optimizer can determine if applying this rule to the query will reduce the cost of the operator. If so, then the optimizer can recommend that the user rewrite this operator of the statement by replacing the UNION operator with the UNION ALL operator. However, with this particular rewrite, the query results may be different, because the UNION ALL operator will not remove duplicates from the results, but the UNION operator will. Thus, the recommendation will include an improved performance benefit resulting from this rewrite, as well as the potential for different query result. If the user decides that the improved performance is worth the trade-off in the results, the user can apply this recommendation to the SQL statement.

In addition to applying rules stored in a knowledge base, the optimizer can accept rules from the user and apply them while considering the annotations. Also, the user can disable certain rules in the knowledge base to prevent the query optimizer from giving recommendations that cannot be implemented by the user.

There are various causes of poor performance, which are related to the structure of a SQL statement, that can be identified and overcome by using the structural analysis process. These causes can be syntax-based, semantics-based, or design issues.

An example of a semantic-based factor that can be analyzed to improve performance is a UNION operator in a SQL statement. The replacement of the UNION operator with the semantically different UNION ALL operator may provide an equivalent result if duplicate rows are not in the result. For example, if the UNION-ALL operator is used for tables that have different data, such as 'last year's sales' and 'this year's sales,' the UNION-ALL operator in this example can provide the same result as the UNION, because the result of the operation has no duplicate rows, making the duplicate elimination performed by the UNION operator redundant. Thus, an analysis of the structure provides a basis to recommend replacing UNION with UNION-ALL, thus eliminating an expensive duplicate elimination procedure from the execution plan.

Another example is the use of the semantic-based NOT IN subquery. When this semantic-based construct is replaced by a corresponding but not semantically equivalent NOT EXISTS subquery, the result can be a significant performance boost. This replacement can be recommended by the analysis process if NULL values are not present in the related join columns, thus ensuring that same result is produced by either of these operators. Another example is Syntax-based constructs are generally used to specify predicates in a SQL statement. The corresponding performance attributes of syntax-based constructs are therefore related to the specification of predicates in the SQL statement. For example, if a predicate such as col=:bnd is used with col and :bnd having different types, then such a predicate is unable to be used as an index driver. Similarly, a predicate involving a function or expression (e.g. func(col)=:bnd, col1+col2=:bnd) on an indexed column prevents the query optimizer from using an index as an access path. As a result, this predicate, which involves this function may not be used as an index driver unless there is a functional index on the function itself. Therefore, rewriting the statement by simplifying the complex predicate can enable index access paths leading to a better execution plan.

Design issues related to performance include an accidental use of a Cartesian product, for example, which occurs when one of the tables is not joined to any of the other tables in a SQL statement. This problem is frequent when the query involves a large number of tables. Therefore, rationale and informative messages can be produced to educate programmers who code SQL statements about potential design improvements to the statements.

For example, during the development stage, developers are generally focused on writing SQL statements that produce a desired result, rather than designing the statement to optimize the performance of the statement. The informative messages can help the developers improve performance by identifying design mistakes and offering alternatives. For example, the structural analysis method can identify a mistake that causes a SQL statement to perform poorly, such as a type mismatch between the column and its predicate value, which essentially disables the use of an index even if one is available, then inform the user of the mistake in the design of the statement.

Figure 2:
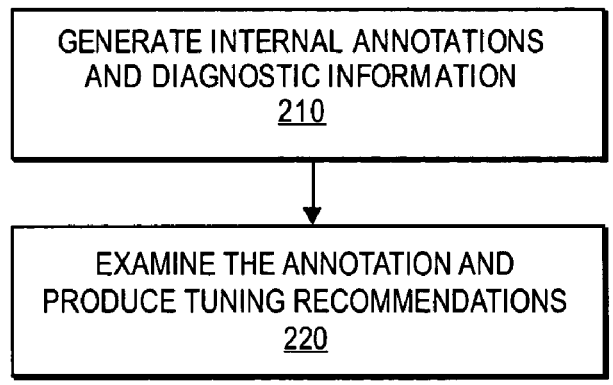
FIG. 2 shows an example of a method for analyzing the structure of a SQL statement.

An example of a SQL structure analysis method that can be performed by the automatic tuning optimizer to detect poor SQL constructs falling into one or more categories listed above is shown in FIG. 2. The SQL structure analysis method is fully cost-based.

The automatic tuning optimizer generates internal annotations and diagnostic information, 210 and associates them to the execution plan operators. The annotations are produced while the automatic tuning optimizer is evaluating the various choices during the process of building the execution plan. Each annotation can be quite extensive and can include the reasons for making a decision as well as the alternatives that were considered and the corresponding reasons for rejecting them. For example, when the automatic tuning optimizer explores the possibility of merging a view, it will check necessary conditions to see if it is logically possible to merge the view. If not possible, it can record the reason for not merging the view. If it can merge but it decides not to merge the view, it can record the reason for not doing so.

After the optimal execution plan has been built, the automatic tuning optimizer examines the costly operators in the annotated execution plan. For example, a costly operator can be defined as one whose individual cost is more than 10% of the total plan cost. The automatic tuning optimizer examines the annotations associated with each of the costly operators and produces appropriate recommendations, 220. The Automatic Tuning Optimizer also provides rationale behind each of its recommendations. For example, a rationale can provide an explanation for using a recommended SQL construct in place of the original one to improve the cost and hence the performance of the corresponding execution plan.

The SQL structure recommendations allow a developer or the optimizer to rewrite a problematic SQL statement. Therefore, the SQL structure analysis method can be used to improve SQL statements while they are being developed, before they are deployed into a production system or a packaged application. Another important benefit of the SQL structure recommendations is that they can help educate the developers in writing well-formed SQL statements.

Figure 3:
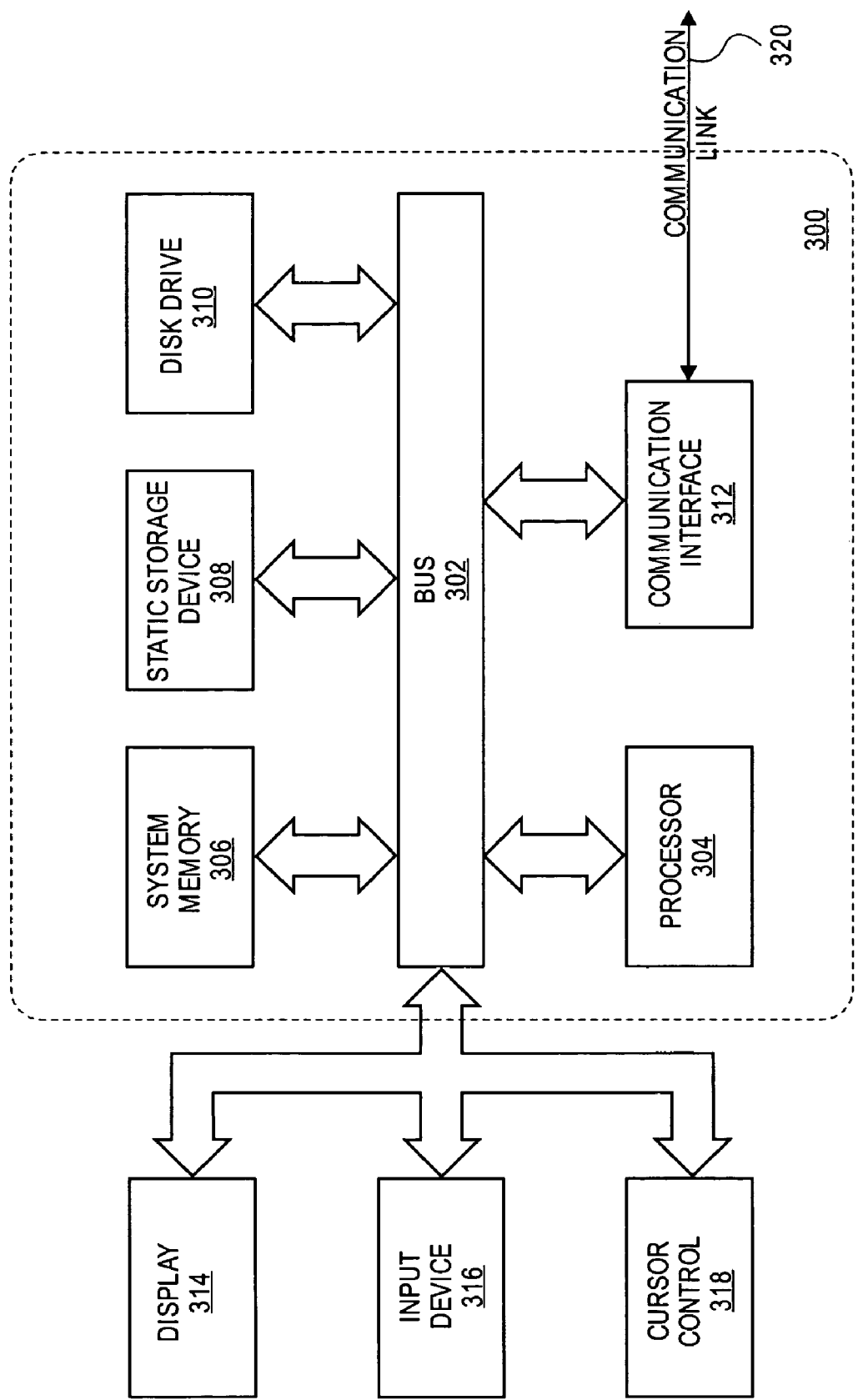
FIG. 3 is a block diagram of a computer system suitable for implementing an embodiment of a SQL structure analyzer.

FIG. 3 is a block diagram of a computer system 300 suitable for implementing an embodiment of the SQL structure analyzer and structural analysis method. Computer system 300 includes a bus 302 or other communication mechanism for communicating information, which interconnects subsystems and devices, such as processor 304, system memory 306 (e.g., RAM), static storage device 308 (e.g., ROM), disk drive 310 (e.g., magnetic or optical), communication interface 312 (e.g., modem or ethernet card), display 314 (e.g., CRT or LCD), input device 316 (e.g., keyboard), and cursor control 318 (e.g., mouse or trackball).

According to one embodiment of the invention, computer system 300 performs specific operations by processor 304 executing one or more sequences of one or more instructions contained in system memory 306. Such instructions may be read into system memory 306 from another computer readable medium, such as static storage device 308 or disk drive 310. In alternative embodiments, hard-wired circuitry may be used in place of or in combination with software instructions to implement the invention.

The term "computer readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as disk drive 310. Volatile media includes dynamic memory, such as system memory 306. Transmission media includes coaxial cables, copper wire, and fiber optics, including wires that comprise bus 302. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 300. According to other embodiments of the invention, two or more computer systems 300 coupled by communication link 320 (e.g., LAN, PTSN, or wireless network) may perform the sequence of instructions to practice the invention in coordination with one another. Computer system 300 may transmit and receive messages, data, and instructions, including program, i.e., application code, through communication link 320 and communication interface 312. Received program code may be executed by processor 304 as it is received, and/or stored in disk drive 310, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. A method comprising:
   receiving a database query language statement at an optimizer;
   evaluating one or more choices in a search space to identify or generate an optimal execution plan for the database query language statement;
   generating an annotated execution plan from the optimal execution plan by producing and storing one or more annotations in the annotated execution plan to explain one or more reasons for the optimizer selecting a choice over an alternative choice during the act of evaluating the one or more choices, wherein
   the annotated execution plan is examined for identifying or generating a recommendation for one or more schema changes and the possible statement modification to rewrite the database query language statement; and
   displaying the recommendation on a display apparatus or storing the result in a tangible computer usable medium or a storage device.

2. The method of claim 1, wherein the one or more annotations for a selected choice comprises:
   one or more semantically different alternatives to the selected choice;
   reasons for not performing one or more rewrites of the database query language statement; and
   information to be displayed to a developer of the database query language statement.

3. The method of claim 2, further comprising:
   associating the one or more annotations for each selected choice to a corresponding operator of the database query language statement.

4. The method of claim 3, further comprising:
   identifying operators of the database query language statement having a cost above a threshold cost;
   for each costly operator, examining the one or more annotations associated with the identified operator; and
   generating a structural recommendation about the costly operator to improve the database query language statement.

5. The method of claim 4, wherein generating the structural recommendation comprising:
   retrieving an alternative operator from the one or more annotations;
   comparing a cost of the alternative operator with a cost of the costly operator; and
   mapping the recommendation to use the alternative operator to the costly operator in the database query language statement.

6. The method of claim 5, further comprising:
   rewriting the database query language statement with the alternative operator; and
   generating an execution plan for the database query language statement with the alternative operator.

7. The method of claim 1, wherein the database query language statement is a SQL statement.

8. An apparatus comprising:
   means for receiving a database query language statement at an optimizer;
   means for evaluating one or more choices in a search space to identify or generate an optimal execution plan for the database query language statement;
   means for generating an annotated execution plan from the optimal execution plan by producing and storing one or more annotations in the annotated execution plan to explain one or more reasons for the optimizer selecting a choice over an alternative choice during the act of evaluating the one or more choices, wherein
   the annotated execution plan is examined for identifying or generating a recommendation for one or more schema changes and the possible statement modification to rewrite the database query language statement; and
   a display apparatus configured for displaying the recommendation or a tangible computer usable medium or a storage device configured for storing the result.

9. The apparatus of claim 8, wherein said means for producing the one or more annotations comprises:
   means for generating one or more semantically different alternatives to the selected choice that each, if used in the database query language statement, produce the same result;
   means for generating reasons for not performing one or more rewrites of the database query language statement; and
   means for generating information to be displayed to a developer of the database query language statement.

10. The apparatus of claim 9, further comprising:
    means for associating the one or more annotations for each selected choice to a corresponding operator of the database query language statement.

11. The apparatus of claim 10, further comprising:
    means for identifying operators of the database query language statement having a cost above a threshold cost;
    means for examining the one or more annotations associated with each identified operator; and
    means for generating a structural recommendation about the costly operator to improve the database query language statement.

12. The apparatus of claim 11, wherein said means for generating the structural recommendation comprising:
    means for retrieving an alternative operator from the one or more annotations;
    means for comparing a cost of the alternative operator with a cost of the costly operator; and
    means for mapping the recommendation to use the alternative operator to the costly operator in the database query language statement.

13. The apparatus of claim 12, further comprising:
    means for rewriting the database query language statement with the alternative operator; and
    means for generating an execution plan for the database query language statement with the alternative operator.

14. The apparatus of claim 8, wherein the database query language statement is a SQL statement 15. A volatile or non-volatile computer readable medium storing a computer program of instructions which, when executed by a processing system, cause the system to perform a method comprising:
    receiving an database query language statement at an optimizer;
    evaluating one or more choices in a search space to identify or generate an optimal execution plan for the database query language statement;
    generating an annotated execution plan from the optimal execution plan by producing one or more annotations to explain one or more reasons for the optimizer selecting a choice over an alternative choice during the act of evaluating the one or more choices, wherein
    the annotated execution plan is examined for identifying or generating a recommendation for one or more schema changes and the possible statement modification to rewrite the database query language statement.

16. The medium of claim 15, wherein the one or more annotations for each selected choice comprising:
one or more semantically different alternatives to the selected choice that each, if used in the database query language statement, produce the same result;
reasons for not performing one or more rewrites of the database query language statement; and
information to be displayed to a developer of the database query language statement.

17. The medium of claim 16, wherein the executed instructions further perform the method comprising:
associating the one or more annotations for each selected choice to a corresponding operator of the database query language statement.

18. The medium of claim 17, wherein the executed instructions further perform the method comprising:
identifying operators of the database query language statement having a cost above a threshold cost;
for each costly operator, examining the one or more annotations associated with the identified operator; and
generating a structural recommendation about the costly operator to improve the database query language statement.

19. The medium of claim 17, wherein the executed instructions further perform generating the structural recommendation comprising:
retrieving an alternative operator from the one or more annotations;
comparing a cost of the alternative operator with a cost of the costly operator; and
mapping the recommendation to use the alternative operator to the costly operator in the database query language statement.

20. The medium of claim 19, wherein the executed instructions further perform the method comprising:
rewriting the database query language statement with the alternative operator; and
generating an execution plan for the database query language statement with the alternative operator.

21. The medium of claim 15, wherein the database query language statement is SQL statement.

22. A method comprising:
receiving a database query language statement at an optimizer;
evaluating one or more choices for operators of the database query language statement to generate an optimal execution plan for the database query language statement;
selecting a choice for each operator;
generating an annotated execution plan from the optimal execution plan by producing and storing one or more annotations in the annotated execution plan to explain one or more reasons for one or more rejected choices that have been rejected by the optimizer for an operator;
generating one or more recommendations for one or more schema changes and for changing one of the operators to rewrite the database query language statement based on the annotations; and
displaying the one or more recommendations on a display apparatus or storing the result in a tangible computer usable medium or a storage device.

23. The method of claim 22, wherein generating recommendations comprises:
identifying a costly operator of the database query language statement;
identifying a rule from the one or more annotations for the costly operator; and
identifying a less costly operator based on the rule.

24. The method of claim 23, further comprising:
recommending that a user rewrite the database query language statement by replacing the costly operator with the less costly operator.

25. A method comprising:
receiving a database query language statement at a query optimizer;
evaluating one or more choices in a search space at the query optimizer to generate an optimal execution plan for the database query language statement;
generating an annotated execution plan from the optimal execution plan by producing one or more annotations in the annotated execution plan, at the query optimizer, to explain one or more reasons for the query optimizer selecting or rejecting a choice over an alternative choice during the act of evaluating the one or more choices, wherein
the annotated execution plan is examined for generating a recommendation for one or more schema changes and the possible statement modification to rewrite the database query language statement;
examining, at the query optimizer, the one or more annotations; and
displaying the recommendation on a display apparatus or storing the result in a tangible computer usable medium or a storage device.

26. The method of claim 25, further comprising:
generating, at the query optimizer, appropriate recommendations to improve performance based on rules in a knowledge base.

27. The method of claim 26, wherein each recommendation includes a recommendation to make database schema changes.

28. The method of claim 26, wherein each recommendation is associated with a rationale and informative messages for user understandability.

29. The method of claim 26, wherein each recommendation is mapped to a corresponding SQL operator in the database query language statement.

30. The method of claim 26, wherein the method further comprising:
producing rewritten statement text for a user.

31. The method of claim 26, wherein the rules in the knowledge base can be customized by a user by adding additional rules or removing existing rules.

* * * * *

UNITED STATES PATENT AND TRADEMARK OFFICE
CERTIFICATE OF CORRECTION

PATENT NO. : 7,634,456 B2  Page 1 of 1
APPLICATION NO. : 10/936426
DATED : December 15, 2009
INVENTOR(S) : Khaled Yagoub et al.

It is certified that error appears in the above-identified patent and that said Letters Patent is hereby corrected as shown below:

On the Title Pg.
Item (*) Notice
Delete "420 days"
Insert -- 541 days --.

On the Title Pg, Item (56) on page 3, under "Other Publications", line 38, delete "Eqypt," and insert -- Egypt, --, therefor.

On the Title Pg, Item (56) on page 3, under "Other Publications", line 47, delete "automatic" and insert -- autonomic --, therefor.

On the Title Pg, Item (56) on page 3, under "Other Publications", line 63, delete "Philadephia," and insert -- Philadelphia, --, therefor.

On the Title Pg, Item (56) on page 3, under "Other Publications", line 2, delete "Termporal" and insert -- Temporal --, therefor.

In column 3, line 38, delete "an notations" and insert -- annotations --, therefor.

In column 8, line 51, delete "statement" and insert -- statement. --, therefor.

Signed and Sealed this

Fourteenth Day of September, 2010

David J. Kappos
*Director of the United States Patent and Trademark Office*